US011870125B2

(12) United States Patent
Chueh

(10) Patent No.: US 11,870,125 B2
(45) Date of Patent: Jan. 9, 2024

(54) BRANCH-LINE COUPLER

(71) Applicant: Nanning FuLian FuGui Precision Industrial Co., Ltd., Nanning (CN)

(72) Inventor: Yu-Chih Chueh, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 336 days.

(21) Appl. No.: 17/318,348

(22) Filed: May 12, 2021

(65) Prior Publication Data

US 2022/0368001 A1 Nov. 17, 2022

(51) Int. Cl.
*H01P 5/22* (2006.01)
*H01P 5/18* (2006.01)

(52) U.S. Cl.
CPC ................ *H01P 5/227* (2013.01); *H01P 5/18* (2013.01)

(58) Field of Classification Search
CPC ...... H01P 5/02; H01P 5/04; H01P 5/08; H01P 5/227; H01P 5/18
USPC .................................... 333/109–12, 116, 117
See application file for complete search history.

(56) References Cited

U.S. PATENT DOCUMENTS 5,132,645 A 7/1992 Mayer
10,644,375 B1 * 5/2020 Chueh ..................... H01P 5/184

FOREIGN PATENT DOCUMENTS

CN 104393390 B 3/2015
CN 206134906 U 4/2017
CN 107565198 A 1/2018
CN 109524755 A 3/2019
TW 202019011 A 5/2020

OTHER PUBLICATIONS

Chu et al., "Fish-bone resonator with new coupling structure and its applications to wideband bandpass filters", Jun. 2013, 2013 IEEE MTT-S International Microwave Symposium Digest (MTT) (Year: 2013).*
Title of the article :A Novel Structure of Compact Microstrip Branch-line Directional Coupler; Name of the author:Shengquan Ma&Shaozhou Zhang; Book title:Electronic Technology; Publication date:Apr. 26, 2010.
Title of the article :Miniaturization of microstrip branch-line coupler; Name of the author:Jia Chen&Shaozhou Zhang; Book title:Electronic Design Engineering; Publication date:Apr. 21, 2012.

* cited by examiner

*Primary Examiner* — Rakesh B Patel
*Assistant Examiner* — Jorge L Salazar, Jr.
(74) *Attorney, Agent, or Firm* — ScienBiziP, P.C.

(57) ABSTRACT

A branch-line coupler, adapted to radio frequency circuits, includes an input port, a first output port, a second output port, an isolated port, a first transmission line, a second transmission line, a first bent branch line, and a second bent branch line. The first transmission line is electrically connected between the input port and the first output port, and carries two open branches. The second transmission line is electrically connected between the isolated port and the second output port, and carries two open branches. The first bent branch line is electrically connected between the input port and the isolated port. The second bent branch line is electrically connected between the first output port and the second output port. The open branches of the first transmission line and the second transmission line resemble the bone structure of a fish skeleton.

9 Claims, 5 Drawing Sheets

BRANCH-LINE COUPLER

FIELD

The disclosure generally relates to microwave couplers, and more particularly to branch-line couplers.

BACKGROUND

It is well-known that directional couplers are usually used to solve the problems relating to power splitting in many microwave circuits. With the development of mobile communication technology and satellite communication technology, for convenient carrying and moving, the miniaturization of communication devices becomes more and more important. However, the conventional 3 dB branch-line coupler occupies a large area of the printed circuit board (PCB). Therefore, a reduction in the area of the branch coupler and maintaining its performance is needed.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
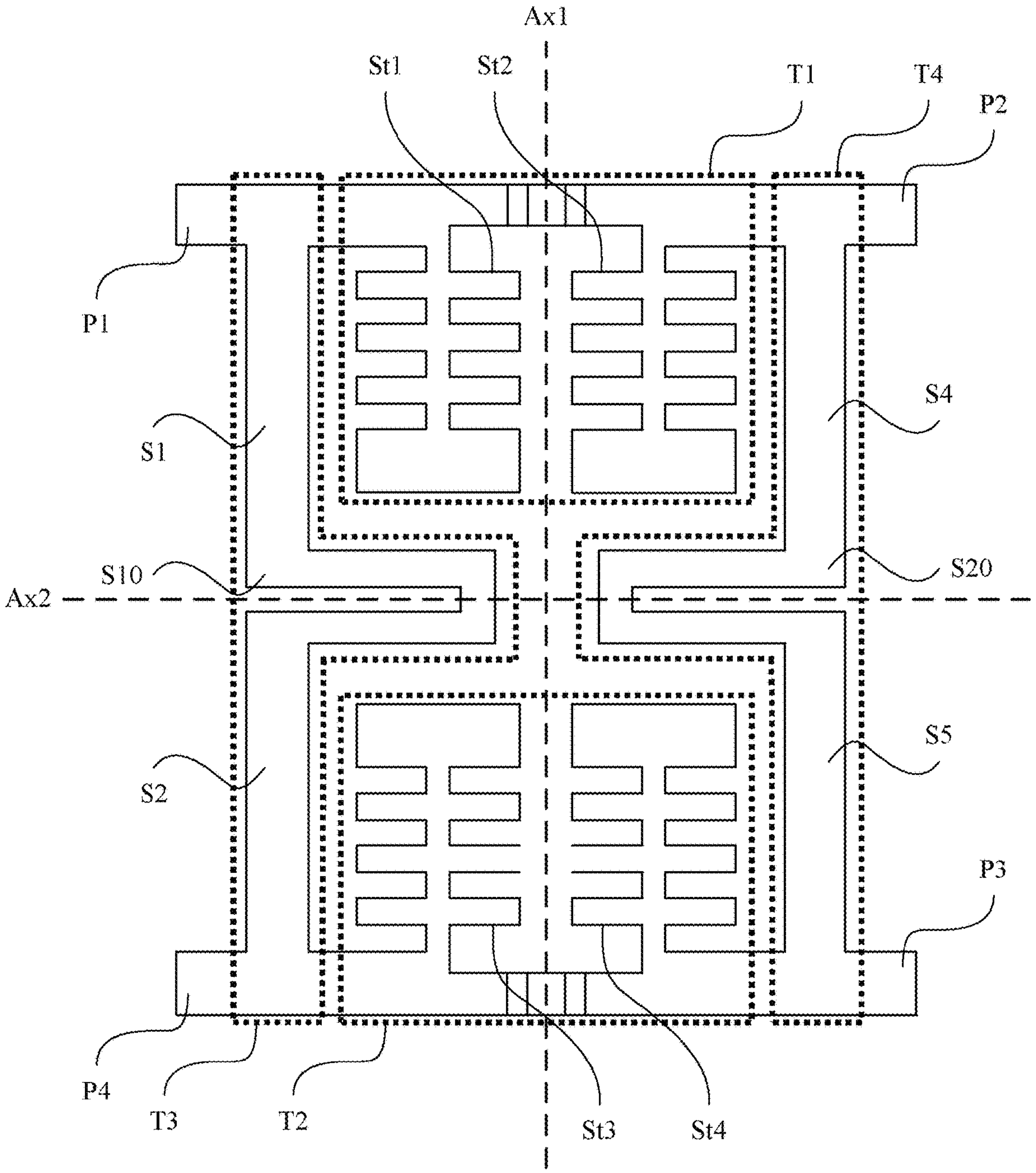
FIG. 1 is a schematic structural diagram of a branch-line coupler in accordance with an embodiment.

FIG. 1 is a schematic structural diagram of a branch-line coupler in accordance with an embodiment. In the embodiment, the branch-line coupler 100 is symmetrical, based on axis Ax1 and axis Ax2. As shown in FIG. 1, the branch-line coupler 100 includes at least an input port P1, a first output port P2, a second output port P3, an isolated port P4, a first transmission line T1, a second transmission line T2, a first bent branch line T3, and a second bent branch line T4. The impedances of the input port P1, the first output port P2, the second output port P3, and the isolated port P4 shown in FIG. 1 and the configuration of the input port P1, the first output port P2, the second output port P3, and the isolated port P4 can be defined according to the user's needs, it is not limited thereto.

The first transmission line T1 is electrically connected between the input port P1 and the first port P2, and the second transmission line T2 is electrically connected between the second port P3 and the isolated port P4. In addition, the first transmission line T1 carries a first open branch St1 and a second open branch St2, and the first open branch St1 and the second open branch St2 are symmetrical around the axis Ax1. The second transmission line T2 carries a third open branch St3 and a fourth open branch St4, and the third open branch St3 and the fourth open branch St4 are also symmetrical around the axis Ax1. The first transmission line T1 and the second transmission line T2 are symmetrical based on the axis Ax2, and the first open branch St1, the second open branch St2, the third open branch St3, and the fourth open branch St4 are all arranged between the first transmission line T1 and the second transmission line T2.

The third bent branch line T3 is electrically connected between the input port P1 and the isolated port P4, and the fourth bent branch line T4 is electrically connected between the first port P3 and the second port P4. The third bent branch line T3 has a first section S1, a second section S2 and a first U-shaped section S10, and the fourth bent branch line T4 has a third section S3, a fourth section S3 and a second U-shaped section S20. The third bent branch line T3 and the fourth bent branch line T4 are symmetrical based on the axis Ax1. In addition, both of the openings of the first U-shaped section S10 of the third bent branch line T3 and the second U-shaped section S20 of the fourth bent branch line T4 face outward. In other words, the opening directions of the first U-shaped section S10 and the second U-shaped section S20 are opposite. The shapes constituted by the third bent branch line T3 and the fourth bent branch line T4 are not to be considered as limited in the disclosure. In addition, according to an embodiment, the first transmission line T1 and the second transmission line T2 can be microstrip lines or other transmission lines.

According to an embodiment, the first transmission line T1 and the second transmission line T2 are equivalent to 35.35 ohm transmission lines, and the third bent branch line T3 and the fourth bent branch line T4 are equivalent to 50 ohm transmission lines. However, it should be noted that the selection of the transmission line parameters as described above can be adaptively selected based on impedance matching, it is not limited thereto.

Figure 2:
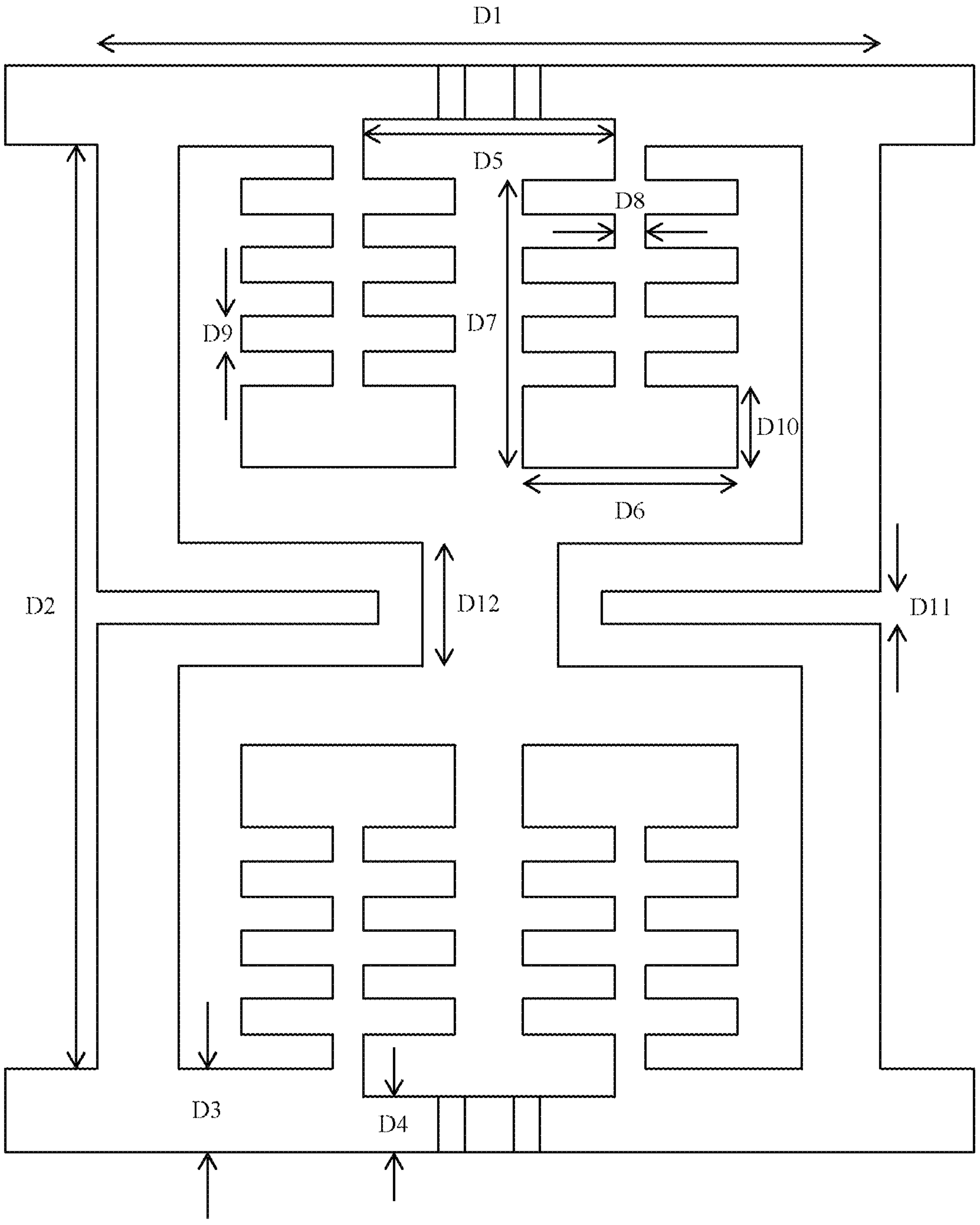
FIG. 2 is a schematic diagram of sizes of structure of the branch-line coupler in accordance with an embodiment.

FIG. 2 is a schematic diagram of structural sizes of the branch-line coupler in accordance with an embodiment. As shown in FIG. 2, a length D1 between the input port P1 and the first output port P2 is smaller than a length D2 between the input port P1 and the isolated port P4. A line width of the first U-shaped section S10 is smaller than the line widths of the first section S1 and the second section S2. The first open branch St1, the second open branch St2, the third open branch St3 and the fourth open branch St4 all have a fishbone-like structure, where a backbone perpendicular to the first transmission line T1 and the second transmission line T2, and the four branches are perpendicular to the backbone. One end of the main backbone of the first open branch St1 and the second open branch St2 is connected to the main body of the first transmission line T1, and the other end is connected to one of the four branches. The line width of the branch connected to the end of the main backbone is larger than the line width of the remaining three branches.

The length D1 between the input port P1 and the first output port P2 is preferably 4.48 mm, and the length D2 between the input port P1 and the isolated port P4 is preferably 5.32 mm. The line width between the first open branch St1 and the first port and the line width between the second open branch St2 and the first output port are both 0.46 mm. The total length D7 of the first open branch St1, the second open branch St2, the third open branch St3 and the fourth open branch St4 is 1.67 mm, the line width D8 of the main backbone is 0.2 mm, and the length D6 of the four branches is 1.2 mm. The line width D10 of the branch connected to the end of the main backbone is 0.47 mm, and the line width D9 of the remaining three branches is 0.2 mm. In addition, the line width D4 of the first open branch St1 and the second open branch St2 on the first transmission line T1 is 0.25 mm for both, and the distance D5 between the two is 1.42 mm. The inner width D11 of the opening of the first U-shaped section S10 is 0.2 mm, and the outer width D12 is 0.7 mm. It should be noted that the structure of the second transmission line T2 is identical and symmetrical to the first transmission line T1, and the structure of the second bent branch line T4 is also identical and symmetrical to the first bent branch line T3. Thus, the structural size of the second transmission line T2 is the same as the structural size of the first transmission line T1, and the structural size of the second bent branch line T4 is the same as the structural size of the first bent branch line T3, and it is not described herein to simplify the description. In addition, in the embodiment of FIG. 2, the area size of the branch-line coupler is 4.48 mm×6.24 mm=27.9552 $mm^2$, while the area size of a conventional branch-line coupler is 7.4 mm×9.14 mm=67.636 $mm^2$. Compared with the conventional branch-line coupler, the branch-line coupler of the present disclosure saves 58.7% of the area size.

Figure 3:
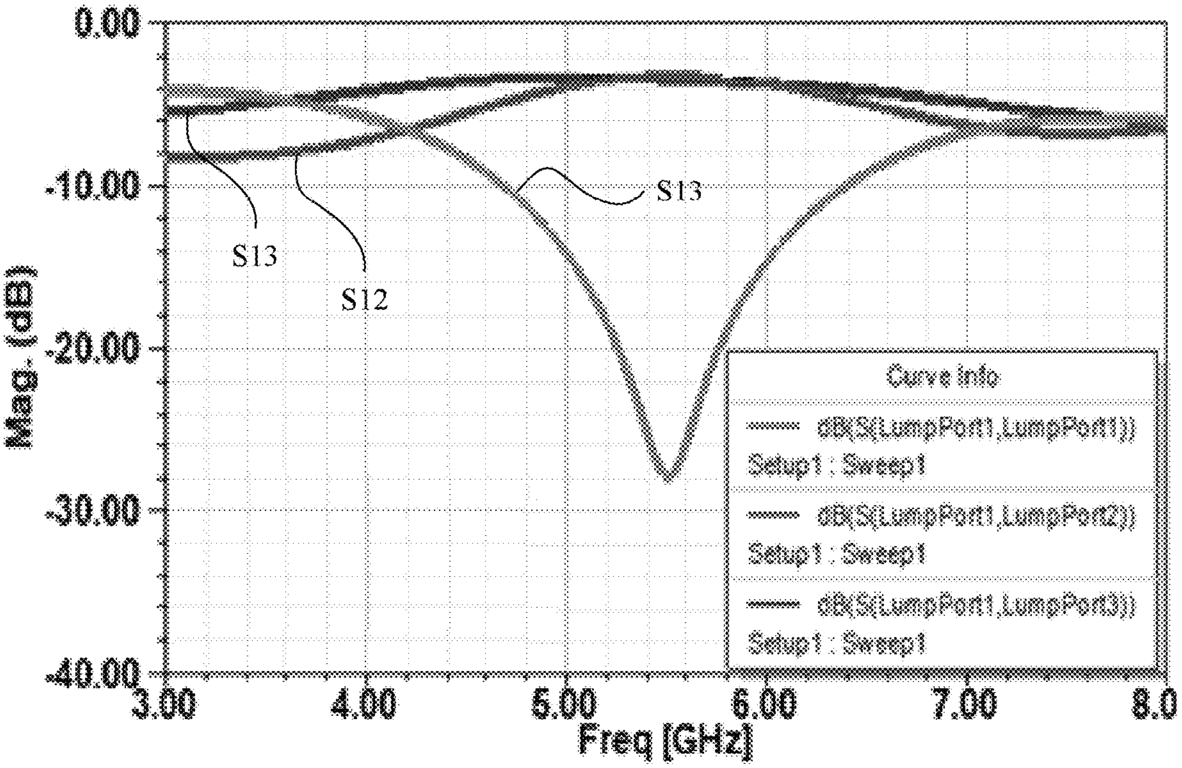
FIG. 3 is an s-parameter simulation diagram of a branch-line coupler in accordance with an embodiment.

FIG. 3 is an s-parameter simulation diagram of a branch-line coupler in accordance with an embodiment. In FIG. 3, the frequency band of the branch-line coupler corresponding to the parameter of S11 below −10 dB is between 4.6 GHz and 6.4 GHz, the center frequency is 5.5 GHz. The S12 and S13 parameters have 3 dB power loss at that frequency band. The parameters S22, S33, and S44 of the first output port P2, second output port P3 and the isolated port P4 are approximate to parameter S11 of the input port 10. For simplicity, diagrams for S22, S33, and S44 are not given. Compared with a conventional branch-line coupler, the branch-line coupler of the present invention has a performance as good as that of a conventional branch-line coupler.

Figure 4:
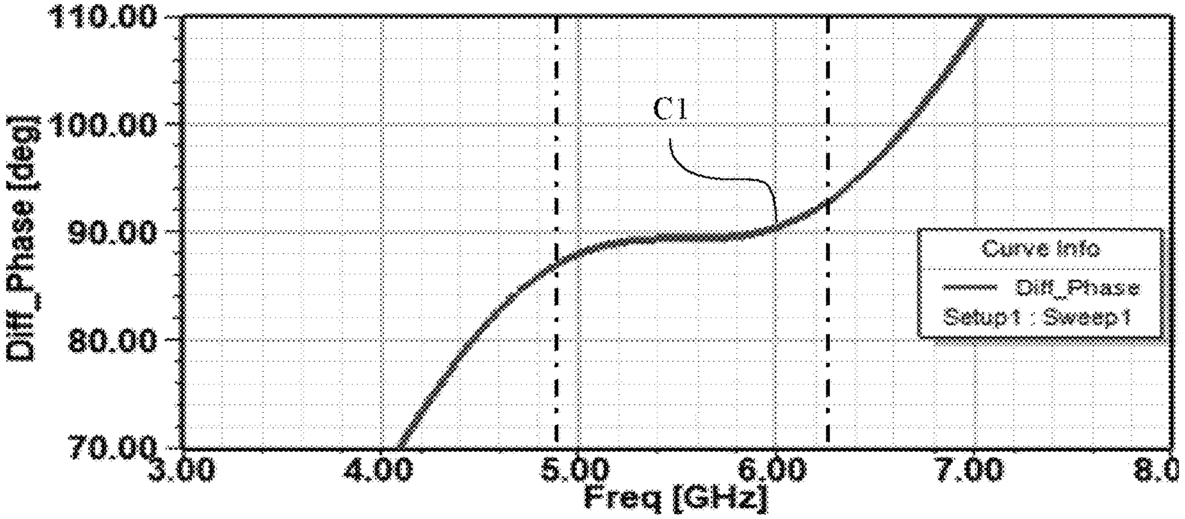
FIG. 4 is an output phase difference diagram of two output ports of a branch-line coupler in accordance with an embodiment.

FIG. 4 is an output phase difference diagram of two output ports of a branch-line coupler in accordance with an embodiment. In FIG. 4, the first output port P2 and the second output port P3 have a small phase difference at the frequency band of 4.9 GHz to 6.2 GHz. Specifically, the output phase difference of the first output port P2 and the second output port P3 is less than 10°.

Figure 5:
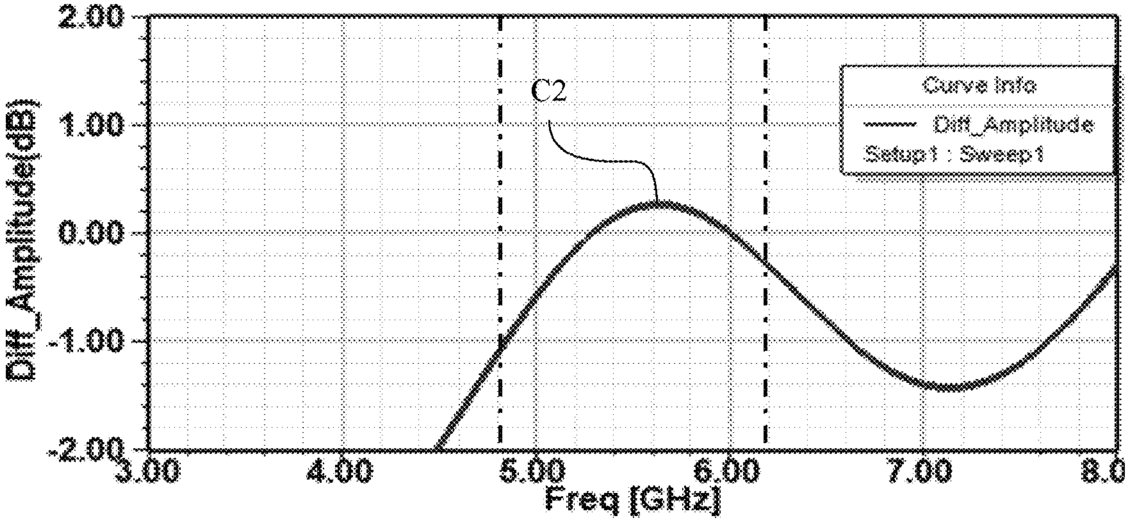
FIG. 5 is an output magnitude difference diagram of two output ports of a branch-line coupler in accordance with an embodiment.

FIG. 5 is an output magnitude difference diagram of two output ports of a branch-line coupler in accordance with an embodiment. In FIG. 5, the first output port P2 and the second output port P3 of the branch-line coupler have a small magnitude output difference at the frequency band 4.9 GHz-6.2 GHz. Specifically, the magnitude output difference between the first output port P2 and the second output port P3 is less than 2 dB.

In summary, the branch-line coupler formed by bent branch lines decreases the size by 58.7% compared with a conventional branch-line coupler. In addition, the coupler has good performance at the frequency band 4.6 GHz to 6.4 GHz, and the S11 parameter is below −10 dB at the aforesaid frequency band. The magnitude of output and output phase of the two output ports have little difference and the two ports of the branch-line coupler have a high degree of isolation. The present coupler not only overcomes the disadvantage of occupying a large PCB area, but also has good performance, and is very suitable for mobile communication products.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A branch-line coupler, adapted to radio frequency circuits, comprising:
 an input port;
 a first output port;
 a second output port;
 an isolated port;
 a first transmission line having two first open branches, electrically connected between the input port and the first output port;
 a second transmission line having two second open branches, electrically connected between the isolated port and the second output port;
 a first bent branch line, electrically connected between the input port and the isolated port; and
 a second bent branch line, electrically connected between the first output port and the second output port, wherein the two first open branches and the two second open branches are fishbone-like structures.

2. The branch-line coupler as claimed in claim 1, wherein the first bent branch line has a first section, a second section, and a first U-shaped section located between the first section and the second section, and the second bent branch line has a third section, a fourth section and a second U-shaped section located between the third section and the fourth section.

3. The branch-line coupler as claimed in claim 2, wherein widths of the first section, the second section, the third section, and the fourth section are greater than widths of the first U-shaped section and the second U-shaped section.

4. The branch-line coupler as claimed in claim 3, wherein an opening direction of the first U-shaped section is opposite to an opening direction of the second U-shaped section.

5. The branch-line coupler according to claim 1, wherein the two first open branches and the two second open branches are symmetrical based on a central vertical line.

6. The branch-line coupler as claimed in claim 1, wherein each of the fishbone-like structures of the first and the second open branches has one vertical section and four horizontal sections.

7. The branch-line coupler as claimed in claim 6, wherein each of the four horizontal sections include a horizontal end section having a width that is greater than widths of the other horizontal sections of the four horizontal sections.

8. The branch-line coupler as claimed in claim 1, wherein the first bent branch line and the second bent branch line are 50 ohm transmission lines.

9. The branch-line coupler as claimed in claim 1, wherein the first transmission line and the second transmission line are 35.35 ohm transmission lines.

* * * * *